(12) United States Patent
Winfield (10) Patent No.: US 10,984,477 B1
(45) Date of Patent: Apr. 20, 2021

(54) PREDICTING BOX OFFICE PERFORMANCE OF FUTURE FILM RELEASES BASED UPON DETERMINATION OF LIKELY PATTERNS OF COMPETITIVE DYNAMICS ON A PARTICULAR FUTURE FILM RELEASE DATE

(71) Applicant: Michael C. Winfield, New York, NY (US)

(72) Inventor: Michael C. Winfield, New York, NY (US)

( * ) Notice: Subject to any disclaimer, the term of this patent is extended or adjusted under 35 U.S.C. 154(b) by 0 days.

(21) Appl. No.: 16/861,572

(22) Filed: Apr. 29, 2020

Related U.S. Application Data (62) Division of application No. 15/992,446, filed on May 30, 2018, now Pat. No. 10,748,215.

(60) Provisional application No. 62/512,396, filed on May 30, 2017.

(51) Int. Cl.
| | | |
|---|---|---|
| G06Q 40/06 | (2012.01) |
| G06K 9/62 | (2006.01) |
| G06N 20/00 | (2019.01) |
| G06F 16/78 | (2019.01) |

(52) U.S. Cl.
CPC ......... *G06Q 40/06* (2013.01); *G06F 16/7867* (2019.01); *G06K 9/6269* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 8,490,125 | B2* | 7/2013 | Grubb | H04N 21/252 725/14 |
| 8,612,311 | B2* | 12/2013 | Gross | G06F 21/10 705/26.8 |
| 2006/0235783 | A1* | 10/2006 | Ryles | G06Q 40/00 705/35 |
| 2008/0004938 | A1* | 1/2008 | Maerz | G06Q 40/06 434/322 |
| 2013/0204664 | A1* | 8/2013 | Romagnolo | G06Q 30/0203 705/7.32 |
| 2013/0311408 | A1* | 11/2013 | Bagga | G06N 20/00 706/12 |
| 2014/0156231 | A1* | 6/2014 | Guo | G06N 7/005 703/2 |

OTHER PUBLICATIONS

Quader et al., "A machine learning approach to predict movie box-office success", 2017 20th Int'l. Conf. of Computer and Info. Tech., IEEE, Dec. 2017, online at ieeexplore.IEEE.org/abstract/document/8281839 (Year: 2017).*

* cited by examiner

*Primary Examiner* — Scott C Anderson
(74) *Attorney, Agent, or Firm* — Glenn E. Gold, P.A.; Glenn E. Gold

(57) ABSTRACT

A computer-implemented method incorporating machine learning (e.g., a support vector machine) for predicting worldwide box office performance of a film prior to its release date, wherein the predicted performance determination is based upon a total audience size relative to a corresponding movie production budget. Total audience size estimate relative to movie production budget is based upon objective likely patterns of competitive dynamics on a particular date, without reliance upon potentially-misleading subjective evaluations.

2 Claims, 1 Drawing Sheet

PREDICTING BOX OFFICE PERFORMANCE OF FUTURE FILM RELEASES BASED UPON DETERMINATION OF LIKELY PATTERNS OF COMPETITIVE DYNAMICS ON A PARTICULAR FUTURE FILM RELEASE DATE

CROSS-REFERENCE TO RELATED APPLICATION

This application is a divisional of co-pending U.S. non-provisional utility application Ser. No. 15/992,446, filed on May 30, 2018, which claims priority to U.S. provisional application No. 62/512,396, filed on May 30, 2017. The entire content of both applications is incorporated-by-reference herein.

FIELD OF THE INVENTION

The present disclosure relates generally to prediction of movie, or film, box office performances prior to their respective release dates. More particularly, the invention pertains to the computer-implemented derivation of accurate and reliable estimates of total movie audience sizes relative to corresponding movie production budgets, based upon likely patterns of competitive dynamics associated with a specified movie release date, without relying on potentially misleading subjective evaluations such as temporary response to marketing materials and the like.

BACKGROUND OF THE INVENTION

The film industry dates back to the early 1890s, when motion cameras were first invented and film production companies were being established. During this period, black and white films were screened in a dark theater room wherein the film itself ran without any sound and typically for about a minute or so. As time passed, technology improved and, as a result, films (alternatively referred to herein as "movies") have become exponentially impressive both from a visual and an auditory stand point. The technological growth has been so explosive that scripts of potential films that could not be made due to lack of technology are now being created.

The box office, or ticket office, is now a multibillion dollar business run by Fortune 500 film production companies. While film production companies are generally responsible for the actual production of a film, film distribution companies are generally responsible for the marketing of a film. Generally speaking, the prediction of box office performances prior to their respective release dates is relevant to both film production companies and film distribution companies. In fact, film distribution companies, or distributors, offer production deals to producers/directors, who may have production studios, but the distributor typically drives the marketing and greenlights the film production budget. Accordingly, use of the prediction method of the present invention is arguably more relevant to film distribution companies than to film production companies.

However, since the benefits of the present invention are applicable to both film production companies and film distribution companies, references made herein to "film production companies," and the like, should be construed to include "film distribution companies," and vice versa, since the present method is actually applicable to any entity that could benefit from optimizing the budget and release date well ahead of the actual release of a film, preferably, during film production budgeting. Some films are made for reasons entirely unrelated to financial gain (i.e. profitability). For example, because Hollywood is very artistic many films are made simply because executives believe in them, even if they fail, while other films are made simply for awards recognition. While making a profit on a film is clearly beneficial, a common benchmark employed in the film industry to define whether a film is deemed a "success" or not is whether the film has reached its "break-even" point; that is, whether the film has earned enough money to at least recoup the money that was spent producing the film. For obvious reasons, the relative abilities of competing film distribution companies to optimize executive decisions concerning film budgeting and release date determination well ahead of time, and most preferably at the time of film budgeting, are relevant to their success. Accordingly, any means available to a film distribution company to enable improved worldwide success of produced films would be welcomed with open arms. In that regard, the availability of a means for improving the accuracy of film release date and budgeting predictions would be highly desirable in the film production/distribution industry. The ability to do so well before the actual release dates of films (e.g., preferably, at the time of film production budgeting) would be very beneficial.

Within the film industry, the conventionally-referenced film calendar year, i.e., when broadly describing the time of year of a film's release, is generally referenced in relation to a particular one of the four corresponding standard calendar year seasons (i.e., spring, summer, fall/autumn, and winter). As part of the film release date/film budgeting calculation, film production/distribution companies often factor in the film calendar season (i.e. correlating to the standard calendar year season). However, determining the effect that a movie release date season, in and of itself, ultimately has on a particular film's worldwide box office performance is, for the most part, a guessing game.

Some of the antiquated models commonly relied upon are based on domestic tracking and/or foreign tracking. However, the use of tracking methods to yield revenue prediction models is known to be biased and unreliable. For example, domestic tracking models are limited in that they only attempt to predict performance for the opening weekend of a film, as opposed to predicting the total audience size over the film's entire theatrical run; thereby discounting the possibility that a film may be front-loaded (e.g., where a disproportionately high portion, such as 80%, of total ticket sales occur during the opening weekend, but then the film flops). Domestic tracking also undercounts American moviegoers who are not active in social media (e.g. older ticket buyers) and, instead, focuses on tracking the fluctuation of a film's marketing campaign, which may be reaching an unrepresentative sample of moviegoers (e.g. moviegoers who are active on certain social media platforms, diehard fans of a particular video game, etc.). Accordingly, domestic tracking does not yield a best estimate of the projected audience size for a film based upon its release date relative to its budget. For example, one week prior to the release of a film domestic tracking could reveal that a film is on track to make $60 million during its opening weekend, but the film might perform poorly overseas. Accordingly, if the film's budget was $220 million, this figure, even if roughly accurate, does not enable a distributor to scale back its budget prior to the film's production or to move the release date to a more profitable, less competitive date (e.g., the opening weekend performance of Solo: A Star Wars Story).

Foreign tracking carries many of the same limitations and flaws associated with domestic tracking, and these limitations are further compounded by the extensive diversity inherent in movie-going audiences attending films (i.e. what may be an attractive film in one country may not be popular in another country based, for example, on the film's content). For instance, a film pertaining to American football may be less attractive to non-American audiences in foreign countries than it is to domestic audiences. Furthermore, in addition to the multitude of issues associated with domestic tracking, foreign tracking figures are typically not comparable to each other across films—including films released on the same date in different years, films released on different dates within the same year, and even films released on the same date within the same year. The reason for this is that films with extensive foreign roll-outs have varied release strategies, and different countries have different movie-going audience sizes. For instance, a first set of six films (e.g., designated Films 1-6) may open in China, South Korea, Japan, and the United States on the same weekend, while a second set of six films (e.g., designated Films 7-12) may open in the same countries (i.e. China, South Korea, Japan, and the United States) on different weekends, and one nation's audience may respond differently to a film than another nation's audience. By predicting the performance of a subsequently-released film (e.g. designated Film 13) on the basis of the total foreign box office performance of Films 1-12, rather than attempting to forecast the opening weekend of each film immediately prior to its release, there is more data available to use, so the likely total box office performance can be predicted on the basis of similarities in respective film production budgets and release dates. Since film distributors jockey for desirable release dates years in advance, providing a best estimate of the total audience size would allow for fine-tuning of a film's budget and/or for selection of a more beneficial release date well in advance of the film's release, rather than observing, on a day-to-day basis, the outcomes after a film has been released and its release date has been established.

Holidays are another predictive factor often relied upon by film production studios. However, reliance upon holidays for predicting the success of a movie prior to its release also has inherent limitations, drawbacks and disadvantages. The history of the film industry is replete with examples illustrating the limitations associated with the use of holidays as a predictive factor used to determine a film release date. Gut intuition might indicate that films will perform better during certain periods of time when more people have free time to view a film, such as the calendar period from Christmas to New Year's, when the vast majority of adults are off from work and children are out of school, or during the summer. One could reason that a film released during December—in light of Christmas and New Year's holidays falling within the same month (i.e. December)—is likely to perform better than a corresponding film released during October. However, this is not necessarily an accurate assumption. For example, Gravity (released Oct. 4, 2013) made $723 million on a budget of $100 million and The Martian (released Oct. 2, 2015) made $630 million on a budget of $108 million, while Chronicles of Narnia: The Voyage of the Dawn Treader (released Dec. 10, 2010) made $415 million on a budget of $155 million and Tron: Legacy (released Dec. 17, 2010) made $400 million on a budget of $170 million. Such differences are also unlikely to be due to an expanding market over time or fluctuating exchange rates, because, for example, Avatar, released in 2009, made $2.7 billion globally with a December $18^{th}$ release date.

Although holidays clearly play some role, they do not fully explain the competitive dynamics at play between films released during overlapping periods. For example, as illustrated above, films released in October compete against films released in December. Furthermore, films released to take advantage of the Christmas holiday often make elevated amounts of revenue prior to the actual winter recess (e.g., Star Wars: The Force Awakens made $363 million prior to Dec. 24, 2015). Thus, for example, one would be guessing to say that a film released on Christmas Day (i.e. December $25^{th}$) will perform better than a film released earlier in the month (e.g. December $13^{th}$).

Accordingly, there is a clear need in the film production/distribution industry for a box office performance prediction method that accounts for cyclical and changing competitive dynamics on a year-to-year basis, and accounts for (using the December time period as an example) the fact that blockbuster films released during December face off in the theaters against so-called "Awards Season" movies that have lower budgets and typically perform worse abroad than they do domestically, as they are primarily produced for domestic audiences and domestic award recognition. This is reflected in the total box office performance of films released on the same/similar dates in the same month in prior years relative to their respective production budgets.

Oftentimes, brand awareness is used as a predictor to guesstimate that a film will perform well (e.g. because "virtually everyone" has heard of it). However, "virtually everyone" has heard of Tarzan, yet the Legend of Tarzan (made with a $180 million production budget and released on Jul. 1, 2016) failed to make at least 3-times its production budget. Yet, although "virtually everyone" has heard of Harry Potter: Fantastic Beasts and Where to Find Them, directed by the same director (i.e. David Yates) and released by the same distributor (i.e., \Varner Brothers) as The Legend of Tarzan, it did exactly that (i.e. made at least 3-times its production budget) on an identical production budget of $180 million. It was released on Nov. 18, 2016. This difference is not likely attributable to a greater number of students on vacation from school (i.e. during the Thanksgiving recess) compared with the number of students on vacation from school during the month of July; rather, it is due to the competitive dynamics during the period of its theatrical run—which were similar to those facing the Hunger Games that debuted on similar dates in November.

Aggregated critical reviews are another film box office performance predictor sometimes relied upon. Although critical reviews may influence the social media buzz for a film, using critical reviews to predict a best estimate of total audience size for a blockbuster film over its entire theatrical nm has its own inherent flaws. The Pirates of the Caribbean movie franchise is a case in point. It has been critically panned repeatedly and consistently receives terrible critical reviews. Yet, the Pirates franchise is extremely profitable, with a worldwide audience size of approximately 75+ million ticket buyers. Furthermore, there is no guarantee that the particular critics participating on movie review aggregator websites are representative of the actual audience for a given film. One reason for this is that most movie critics on such sites are native speakers of English who primarily write for American or British publications, and the internet traffic to a given movie review aggregator website is not necessarily predictive of ticket buying behavior around the world. Predicting a best estimate of the likely audience size is essentially predicting how many people are likely to purchase tickets over the course of a film's theatrical run (e.g. a less than $531 million worldwide box office return divided by an average ticket price of $10/ticket equals less than 53.1 million ticket purchasers).

Historical patterns have also been used as a predictive factor. Utilizing historical patterns to arrive at a good release date is also a flawed methodology because historical patterns are highly dependent upon competitive dynamics, which are subject to change. For example, one might "predict" that April would be a terrible release period for a given movie because a particular competing movie series (e.g. the Fast and Furious movie series) typically dominates the box office during April. However, this prediction would be completely inaccurate if, during a particular year, there is not a release of a Fast and Furious movie. Furthermore, this prediction would still be inaccurate if there is a release of a Fast and Furious movie, but the release date falls in the middle of April, which could potentially provide space (i.e. for release of the given movie) for the first half of April (i.e. prior to the release date of the competing Fast and Furious movie). As a further example, one could predict that March would be an excellent month to schedule the release of a film based upon an assumption that the March release date will enable the film to avoid the intense competition known to occur during the summer movie release period. However, such an assumption could have disastrous consequences if the competitive dynamics have changed such that March turns out to be crowded with various blockbuster movies all pursuing the same "escape from intense competition elsewhere" strategy. Instead, it would be highly desirable to have access to a more objective, accurate and reliable method for predicting, well in advance of an announced film release date (and preferably during production budgeting), a likely audience size for a particular film relative to the film's budget and the likely competitive dynamics during a proposed film release date. It would be even more beneficial to have access to such a method functioning to provide machine-learning-generated film box office performance predictions based upon identification of stable competitive dynamics patterns. The general concept of incorporating machine learning as a means for generating box office performance predictions, rather than human calculation-based means used in the past, has been proposed. However, the general consensus in the film industry is that proposed conventional machine learning technology (e.g. machine learning relying upon neural network algorithms) is not yet accurate enough. Various other box office performance prediction methods (e.g. based upon the number of pre-sold showings, ComScore PreAct measures, and CinemaScore ratings) suffer from similar drawbacks, disadvantages and limitations as the above described known methods.

Accordingly, it would be very highly desirable to provide an improved film box office performance prediction method that overcomes the aforementioned drawbacks, disadvantages, and limitations associated with the various techniques, methods, and other means that have been heretofore used. Preferably, the desired method would incorporate an improved machine learning methodology actually capable of providing reliable estimates of total audience size relative to film production budget on a given film release date, given the likely patterns of competitive dynamics on that particular day in that month of that year, without relying on potentially misleading subjective evaluations, thereby enabling better film production budgeting and release timing decisions at the time of budgeting.

BRIEF SUMMARY OF THE INVENTION

The present disclosure is generally directed to a film box office performance prediction method implemented utilizing machine learning operating upon a computer, wherein a unique machine learning methodology enables the determination of reliable estimates of total audience size relative to a film production budget on a given film release date, given the likely patterns of competitive dynamics on that particular day (i.e. release date) in that month of that year, without reliance on potentially misleading subjective evaluations, thereby enabling improved film production budgeting and release timing decisions well in advance of the release date, and preferably at the time of budgeting.

In one exemplary implementation, a method, in a data processing system, is provided for predicting worldwide film box office performance, including:

providing a plurality of data records pertaining to a corresponding plurality of previously-released films having respective film release dates falling within a predefined film release date range, film production budgets of at least a predefined film production budget minimum value, and the film worldwide box office gross falling within a predefined film worldwide box office gross range;

providing at least one data record pertaining to one or more corresponding films slated for future release, the at least one data record comprising information pertaining to a proposed film release date and a proposed film production budget;

identifying, via a learning machine functioning as a learning model, relevant patterns based upon objective data associated with the plurality of data records pertaining to the previously-released films for subsequent use predicting the future worldwide box office performance of the one or more films slated for future release;

creating a learned model, using the plurality of data records pertaining to the corresponding plurality of previously released films, the learned model configured for applying a learning machine algorithm thereto in order to generate a worldwide box office return prediction, using the at least one data record, for the one or more corresponding films slated for future release;

optimizing the learning machine algorithm using a cross-validation optimization technique; and applying the optimized learning machine algorithm to the at least one data record to predict the worldwide box office performance for the one or more films slated for future release, based upon the corresponding proposed film release date and proposed film production budget.

In an aspect, the learning machine is preferably a support vector machine (SVM).

In an aspect, the prediction method accounts for cyclical and changing competitive dynamics.

In accordance with another exemplary implementation, a computer-implemented method for predicting the worldwide box office performance of at least one film slated for future release is provided, which may include steps of:

(a) providing a first set of data records each including information pertaining to a film production budget, a film release date, and a film worldwide box office gross, for a previously-released film, the film production budget equal to or greater than a predefined film production budget minimum value, the film release date falling within a predefined film release date time period, and the film worldwide box office gross falling within a predefined film worldwide box office gross range;

(b) providing a second set of data including at least one data record pertaining to the at least one film slated for future release, the at least one data record including information pertaining to a proposed film release date and information pertaining to a proposed film production budget;

(c) defining a plurality of film release date competitive time periods, each competitive time period defined by at least one calendar date range;

(d) generating a plurality of timing factors, each timing factor corresponding to one of the plurality of film release date competitive time periods;

(e) extracting a calendar month component from the film release date of each one of the first set of data records, comparing each extracted calendar month component to the defined film release date competitive time periods to determine which one of the competitive time periods the film release date corresponds to, and associating a respective corresponding one of the generated timing factors with each one of the first set of data records;

(f) defining a plurality of worldwide box office performance classifications, each film worldwide box office gross of each one of the first set of data records correlating to one of the worldwide box office performance classifications;

(g) associating a unique identifier with each defined film worldwide box office performance classification;

(h) comparing the film worldwide box office gross of each one of the first set of data records to the box office performance classifications to identify a respective box office performance classification corresponding with each film record of the first set of data and, based upon the results of each said comparison, associating one of the unique identifiers to each one of the first set of data records, thereby enabling grouping of subsets of the first set of data records based upon worldwide box office performance classification;

(i) defining the first set of data as a training set, and defining the second set of data as a test set;

(j) creating a model to be used to apply a machine learning algorithm, and subsequently importing the machine learning algorithm for use generating a predicted performance of the test set;

(k) optimizing the machine learning algorithm using the training set; and (l) applying the optimized, trained machine learning algorithm model to the test set to obtain a worldwide box office performance prediction of the at least one film associated with the at least one data record of the second set of data.

In a further aspect, optimizing the machine learning algorithm may be accomplished by applying either a radial kernel or a polynomial kernel on the training set using k-fold cross-validation.

In a further aspect, the method may further include, after the step (l) of applying the optimized, trained machine algorithm model to the test set, additional steps of:

(m) defining a film worldwide box office performance rule to determine whether at least one of the film proposed release date and the film proposed production budget associated with the at least one film slated for future release should be changed; and (n) applying the worldwide box office performance rule to the obtained worldwide box office performance prediction of the at least one film associated with the at least one data record of the second set of data.

In another aspect, the step (m) of defining a film worldwide box office performance rule may include defining a "3-times budget" rule wherein the predicted film worldwide box office performance, or return, should be at least three-times the film's production budget or else the proposed release date, the proposed production budget, or both should be changed and the method repeated.

In a further aspect, the method may include a step of utilizing a support vector machine (SVM) model to analyze one or more of the following: (a) a budget distribution of a subset of movies in the first data set for a user-specified movie release date year; (b) a ratio of a particular box office performance classification for a subset of movies in the first data set for a user-specified release date year; (c) a typical box office performance classification for a subset of movies in the first data set for a user-specified release date month; (d) a typical box office performance classification for a subset of movies of the first data set for a user-specified movie release date competitive time period; and (e) a typical box office performance classification for a subset of movies of the first data set for a user-specified movie release date day.

In another aspect, the step (f) of defining a plurality of worldwide box office performance classifications may further include determining implicit competitive dynamics based upon a combination of one or more of movie production budget, movie release date, movie release day, movie release month, movie release year and movie release competitive period, of the first movie data set.

In another aspect, the learning machine (SVM) model may be used to analyze at least one of: (a) a budget distribution of a subset of movies in the first data set for a user-specified movie release date year; (b) a ratio of a particular box office performance classification for a subset of movies in the first data set for a user-specified release date year; (c) a typical box office performance classification for a subset of movies in the first data set for a user-specified release date month; (d) a typical box office performance classification for a subset of movies of the first data set for a user-specified movie release date competitive time period; and (e) a typical box office performance classification for a subset of movies of the first data set for a user-specified movie release date day.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawing.

DETAILED DESCRIPTION OF EXEMPLARY IMPLEMENTATIONS

The following description is merely exemplary in nature and is not intended to limit the described implementations/embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described herein are exemplary in nature. Those of ordinary skill in the art, with the included descriptions, will be able to implement appropriate functionality without undue experimentation. They are not intended to limit the scope of the invention, which is defined by the claims. Furthermore, there is no intention to be bound by any expressed or implied theory presented in the preceding technical field, background, brief summary or the following detailed description.

Various implementations, or embodiments, of the present invention are concerned with predicting the box office performance of films, preferably at the time of film budgeting, based upon objective data, as opposed to subjective information relied upon by conventional box office performance prediction techniques or methods. Generally, implementations of the present method predict film box office performance based upon total film audience size relative to a corresponding film production budget. The benefits associated with improving the accuracy of predictions, or estimates, of the expected box office performance of films—particularly high budget blockbuster films—at the time of budgeting cannot be overstated.

Accordingly, availability of a film box office performance prediction method capable of consistently and efficiently returning accurate predictions vis-a-vis various prediction means that have heretofore been relied upon would be particularly beneficial to a film distribution company, or film distributor. Furthermore, providing such capabilities in an objective, machine learning-based fashion makes the present method even more beneficial. For instance, in the context of a film distribution company, the capability to accurately predict an individual film's future performance without reliance upon the collection, analysis, and application of subjective information and data (e.g. marketing campaign characteristics, random intrusions that may occur during film production, critical reviews, etc.) enables critical decision making with regard to establishing a film release date well in advance of the actual release, and preferably, at the time of film production budgeting. Since film production studios commonly fight over release dates for competitive advantage, it follows that the ability of a film distributor to make more efficient, expeditious film release date decisions at the time of budgeting will provide a substantial competitive advantage over competing film distributors relying upon conventional means.

Significantly, implementation of the claimed invention does not relate to data comparisons that can be performed mentally or are analogous to human mental work. On the contrary, implementation of the method is reliant upon machine learning wherein statistical techniques enable computer systems to learn (i.e., progressively improve performance on a specific task) with data, to construct an algorithm that can subsequently learn from and make predictions on data. Such algorithms overcome following strictly static program instructions by making data-driven predictions or decisions, through building a model from sample inputs. Machine learning is employed in a range of computing tasks where designing and programming explicit algorithms with good performance is difficult or not feasible.

That is to say, the inventive method is implemented utilizing machine learning operating upon a computer to provide an optimal process for deriving accurate and reliable estimates of total audience sizes relative to corresponding movie budgets well in advance of an actual film release, and preferably during film budgeting. Machine learning focuses on providing predictions based on known properties learned from a training set of objective data. With respect to the implementations, or embodiments, of the invention described below, it is preferred that the type of learning machine utilized is a support vector machine (SVM), which functions as a learning model with associated learning algorithms that analyze data used for non-linear classification analysis. Although implementation of the present invention is in no way limited to the use of SVM-type machine learning algorithms, the present inventor used SVM because it was believed to be the most accurate machine learning algorithm for this particular non-linear task.

As described in greater detail below, implementation of the present method incorporates a unique application of support vector machine (SVM) technology to identify relevant patterns associated with objective data corresponding to particular subsets of previously released films in order to provide an individual user employing the method with repeatable, accurate predictions of the performance of one or more corresponding as-of-yet unreleased films, via pattern classification, and employing a radial basis function kernel or a polynomial kernel to optimize a generated SVM algorithm on a training subset of previously released films using a particular cross-validation method.

In accordance with a preferred implementation, the method is employed to derive a total film audience size prediction relative to corresponding film production budget based upon likely patterns of competitive dynamics on a particular date (i.e. day of month of year), without relying on often-misleading subjective evaluations, such as temporary responses to marketing materials (e.g. move trailers, posters, internet speculation, and social media, such as Twitter feed activity of a movie's director and stars, critical reviews, and the like).

As generally referenced above and described in greater detail below, the method of the present invention is preferably implemented in the form of a support vector machine (SVM) performing non-linear classification. Although the present applicant has found great success implementing the method using a particular programming/coding language commonly referred to in the computer coding industry as "R," the novel method of the present invention could be implemented utilizing any of a vast array of alternative programming/coding languages, without departing from the intended scope of the invention. The present invention is particularly concerned with a novel method for film box office performance prediction via SVM learning, as opposed to an invention directed specifically to SVM learning technology itself. Furthermore, applicant's use of R coding was merely optional; the invention is in no way directed to the particular code itself. In other words, SVM technology and R coding language merely function as the vehicles used to enable, and facilitate implementation of, the inventive method. Comprehensive in-depth knowledge of SVM technology can be found in countless publications, articles, and the like.

Machine learning methods, such as SVM, are commonly referred to as "black box" processes. As one of the most powerful machine learning algorithms, SVM is applied to tasks across many domains. However, its inner workings can be difficult to understand. In engineering, this is referred to as a "black box" process because the mechanism that transforms the input into the output is obfuscated by a figurative box. Machine learning processes, such as SVMs, are considered to be black box techniques because the underlying models are based on complex mathematical systems, and the results are difficult to interpret. Support Vector Machines use multidimensional surfaces to define the relationship between features and outcomes. In spite of their complexity, these models can be applied to real-world problems. This is significant with regard to the present invention. As will be readily apparent to those skilled in the art of machine learning, unique processes incorporating machine learning (e.g. SVM)—such as the present invention—are highly complex and well beyond the realm of methods that could be considered abstract ideas, such as fundamental economic processes, certain methods of organizing human activities, an idea of itself (e.g. merely comparing information regarding a sample or test subject to a control or target data, or claiming an abstract idea requiring no more than a generic computer to perform generic computer functions that are well-understood, routine, and conventional activities previously known in the art), a mere mathematical relationship/formula and the like.

The present method may be carried out on any one of myriad forms of computer devices, such as a conventional standalone computer workstation having an operating system stored thereon, and generally including (among other things): a hard drive (incorporating permanent memory storage); a control unit (alternatively referred to as a control system or central controller) for managing the computer's various components, reading and interpreting (i.e. decoding) program instructions, and transforming them into control signals that activate other parts of the computer; a central processing unit (CPU), alternately referred to as a "processor" or "microprocessor," generally comprised of the aforementioned control unit, an arithmetic logic unit (ALU) for performing arithmetic and logic functions, memory cells (i.e. registers); and computer main memory data storage devices, in the form of computer hardware integrated circuits, including high-speed volatile random-access memory (RAM) modules (e.g. static RAM and dynamic RAM) and non-volatile memory (e.g. read-only memory, or ROM), flash memory and the like. Furthermore, the memory incorporates at least one instruction set executable by a processor to implement the film worldwide box office performance prediction system and method, using machine learning, in accordance with the present invention. Furthermore, the computer system may include any of a variety of peripheral devices/components, such as computer input devices (e.g. computer keyboard, mouse, etc.), and computer output devices (e.g. computer display, sound card, video card, printer, etc.). In a preferred implementation, the present method is performed on a stand-alone computer. However, the computer device may be networked to other computer devices (including, for example, a computer server), either directly or via the Internet. For example, one could, for parallel processing purposes, run the code on a computer that is a part of a local area network (LAN).

Figure 1:
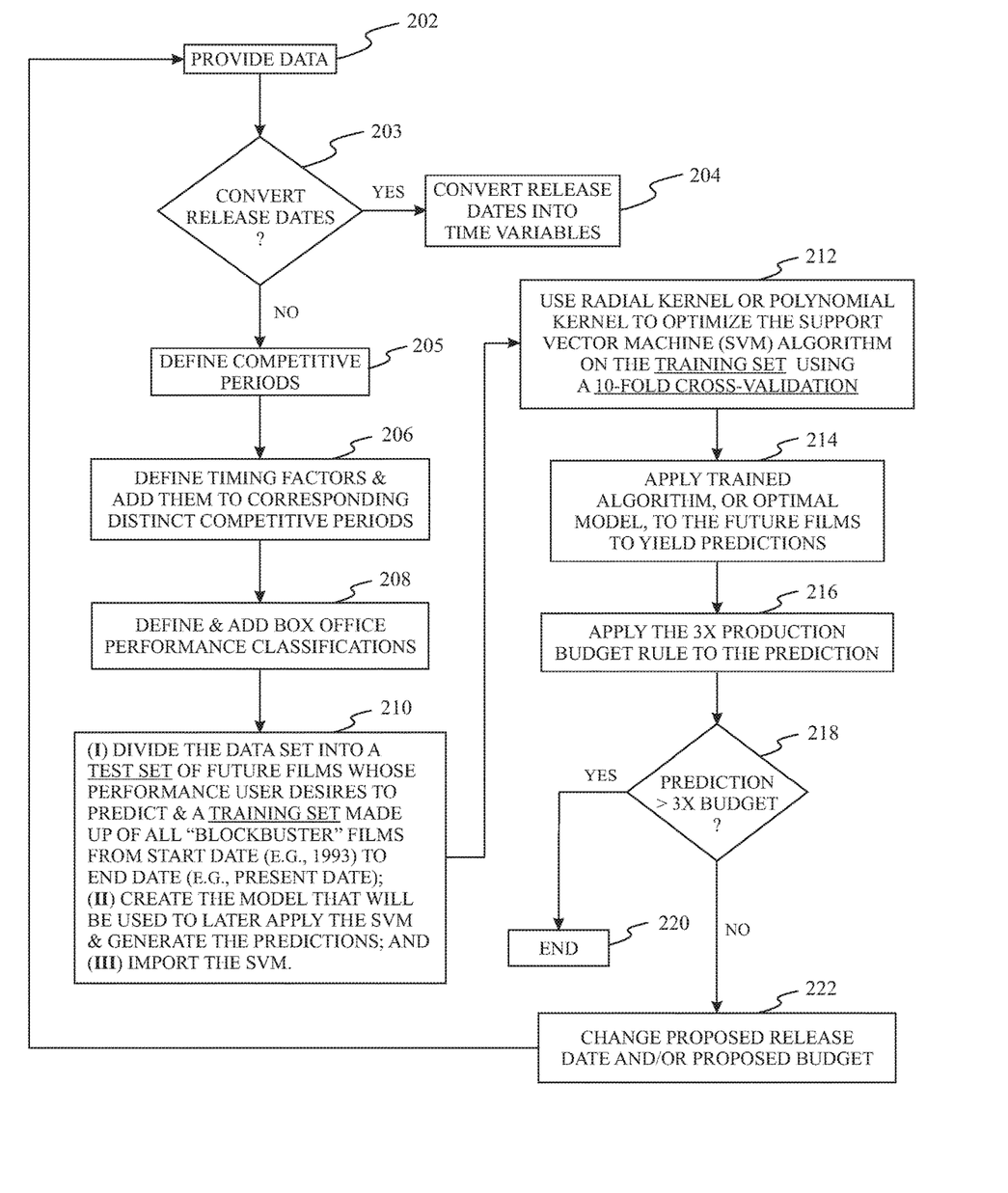
FIG. 1 is simplified flow diagram illustrating an exemplary method for implementing a box office performance prediction method in accordance with the present invention.

Referring now to FIG. 1, an exemplary implementation of the film box office performance prediction method, generally identified by reference numeral 200, will now be described.

Initially, in Step 202, at least the following data is provided (e.g. collected and stored) on a computer device for all domestic and foreign films released from a predefined start date (e.g. Jan. 1, 1993) to a present/current date (e.g., the date on which the method is being applied), which have an after tax (or post-rebate) film production budget of at least a predefined film minimum budget (e.g. a budget categorizing the film as a "blockbuster movie," such as a budget of $96 million): (a) foreign box office gross; (b) domestic box office gross; (c) release dates; and (d) production budget. Optionally, the collected/stored information may include additional information, for example, information/data associated with the release date, production budget, and worldwide gross. As used herein, the terms "present date," "current date," and "relevant date" are all intended to refer to the date (i.e. Month/Day/Year) on which the analytical method is being performed by a user.

In accordance with an implementation, the stored characteristic data of each associated stored previously-released film include the respective film release date, production budget, and worldwide gross, where the worldwide gross represents the combined domestic and foreign box office grosses for a film. The collected data is preferably provided in the form of a text document, or text file (e.g. preferably in the form of a spreadsheet), containing the aforementioned data imported for storage as data within a computer file system, for all movies from the predefined start date to the present date having an after-tax, post-rebate production budget of at least the predefined (e.g. blockbuster) movie production budget minimum value. For example, where the predefined blockbuster movie production budget minimum is set at $96 million the data text document would include the release date, production budget, and worldwide gross data for all major motion pictures with budgets of $96 million or higher released during the year 1993 through the established end date (e.g., the current date). Again, the data is organized in the text document; preferably, in the form of columns and rows (e.g. as a cell-based spreadsheet), wherein each included film record is contained within a single row of the text document, with the corresponding relevant film record data organized into individual columns.

Preferably, each data column includes a respective labeling/heading identifying the specific data contained therein. For instance, in a preferred implementation such column labels/headers may be entitled, "Film Release Date," "Film Production Budget," and "Film Worldwide Gross." Conventional spreadsheet-type programs may be employed. Although conversion of data from strings to numerics is not necessary to implement the present method, most spreadsheet-type applications provide functions to convert between text and numbers. Accordingly, as part of this step, worldwide gross and production budget data imported in the form of text strings could, if necessary, be subsequently converted into respective corresponding numerical values so that they are in a format amenable to subsequent method step calculations.

As used herein, the terms "after-tax," "post-rebate," and the like, refer to movie production incentives, for example, in the form of tax benefits offered on a state-by-state basis throughout the United States to encourage in-state film production. Many include tax credits and exemptions, and other incentives packages include cash grants, fee-free locations, or other perks. In accordance with a preferred, but not limiting, implementation the present method is used to predict worldwide box office performance for so-called blockbuster films. Accordingly, in Step 202, the production budget and release date analysis is preferably confined to appropriate blockbusters (e.g. collecting data from 1993 to 2024 to predict box office performance classification of a film being released in 2025).

In addition to the above-described previously-released film data, additional data is provided (e.g., imported, input, etc.) corresponding to one or more future films whose box office performance the method is intended to predict. Together, the previously-released film data and the data corresponding to the future film(s) (i.e., whose box office performance the method is intended to predict) is referred to as the "dataset."

In Step 203, a determination is made as to whether or not the release dates are provided as time variables or not. If, in Step 202, the release dates were already provided as time variables then the process continues directly from Step 203 to Step 205 (below). If the release dates are not already provided as time variables, then in Step 204, the release dates are converted into time variables. For example, where R-coding is employed, dates are represented as the number of days since Jan. 1, 1970 (i.e. Jan. 1, 1970), with negative values for earlier dates. In that case, the release date for a respective film is converted into a so-called "as.date" variable. Regardless of the particular software coding used, the release date data is formatted as month, day, and year (i.e. into independent month, day and year variables). Significantly, this results in all three components of the film release date being independently available for subsequent method step computations.

The specific selection of production budget and release date data is a very significant feature of the method. There are multiple benefits of selecting variable data on production budgets and release dates. With regard to production budgets, the production budget data can be used to identify a film With regard to release dates, film studios fight over release dates for competitive advantage. Furthermore, both production budget and release date variables are established, or set, prior to a film's release, and often a year or more ahead of time. For example, it is preferred that the film release date is established at the time of production budgeting. So, predicting box office performance on the basis of such variables is scientific, reliable, and very useful to a movie studio. A movie studio knows what production budget it is considering for a film it plans to distribute; a movie studio also knows what release dates it is considering. Since movie studios would be the primary users of the present invention, access to accurate production budget and release date data can be readily obtained/collected from such studios without having to be disclosed to the press or on the internet, such that the movie studios can discreetly make better budgeting and release date decisions, a year or more ahead of time, preferably during the time of budgeting.

Furthermore, the way in which the release date is used in accordance with the present method is significant. Significantly, in developing a method of predicting the box office performance classification of particular films, the inventor sought to model real events in time and space. The fact that the present method is modeling real events in time and space is readily apparent not only from what the present inventive methods are, but also what they are not. Most blockbuster films have a foreign release date within approximately two weeks of their respective American release date. In accordance with the present method, one could theoretically improve the model by explicitly including a related three-factor feature (e.g., +/−2 weeks; +/−5 days; +/−3 days). By contrast, the present invention is not a method geared for predicting a film's opening weekend box office performance, which tracking may aim to do approximately 6 weeks ahead of a film's release. This is a strength of the method, as films with identical opening weekends can have quite varied runs, due to different total audience sizes, after their opening weekend. The movie Frozen, which was produced with a $150 million budget, had an opening weekend box office return of about $66 million, yet ultimately grossed $1.2 billion; while the movie Thor, which was made with approximately the same $150 million budget, and also had an opening weekend box office return of about $66 million, ended up with a total gross of only $449 million.

In Step 205, competitive time periods are defined. With respect to release date, there are competitive dynamics at play relevant to corresponding competitive periods that the present inventor derived through experimentation (i.e. referred to as "summer," "awards season," "dump months," and "aggressive" competitive periods) and effects relevant to the particular day, month, and year of the release date. Using both production budget and release date variables also allows for particularizing the film on the basis of the characteristics related to its economic performance without accounting for a title/brand. For example, if Film 1 was released on Mar. 10, 2012 with a production budget of $124 million and Film 2 was released on Mar. 18, 2011 with a production budget of $125 million, these two films, while similar, are also distinguishable by SVM on the basis of the relevant characteristics.

While it is contemplated that the exact timeframes corresponding to the aforementioned competitive periods could be changed without departing from the scope of the invention, the months corresponding to the summer months (i.e. May, June, and July), awards season months (i.e. September, October, November, and December), and dump months (i.e. January, February, and August) are unlikely to change.

In Step 206, competitive period timing factors are defined such that each competitive period has an associated timing factor. As is described in greater detail below, the release date "month" variable is extracted from each record in the dataset pertaining to a previously-released film, and the corresponding competitive period timing factors are subsequently added (i.e. related to the respective records of the dataset) based upon the release date month of each respective record. The timing factors correspond to the predefined distinct competitive time periods, which are partitioned into the following release date time periods: (a) summer months; (b) awards season months; (c) dump months; and (d) aggressive months.

The summer months competitive time period preferably includes the months of May, June, and July. For the big budget blockbuster movies looking to break records the summer season used to run from June to late July. However, more recently, the month of May is commonly used as the beginning "summer" month, while August is basically the last leap for studios now. While May falls during the school year, studios understand the psyche of movie lovers, making them think that they're getting an early start to the "upcoming summer" blockbuster season.

The "awards season" competitive time period runs through autumn months (i.e. September, October, and November) into December, every year, in the United States, during which a majority of important film award events take place.

The "dump months" are defined as the two periods of the year when there are reduced (or lowered) commercial and critical expectations for most new releases. Audiences during these periods are smaller than they are during the rest of the year. Dump months typically include the winter months of January and February, along with the month of August. Releases during those times primarily include films that would have been released at other times of year had they done better during test screenings, films with less prominent stars, genre films, movies that cannot be easily marketed, and films intended for a teenage audience, which have fewer entertainment options outside the home. Both dump month periods immediately follow the times of year in which the distributors concentrate films they expect to be the biggest critical and/or commercial successes; periods of increased spending on entertainment in general.

For the purpose of the present disclosure, the remaining months of March and April will be referred to herein as the "Aggressive Months" competitive time period. As used herein, the term "Aggressive" is intended to capture the release of films during the months of March and April in an effort to beat out the summer competition early.

Although these competitive periods could change, it is unlikely that the months corresponding to the summer, awards season, or dump months will change. With that said, it will be apparent to those skilled in the art that the incorporation of competitive periods as a factor in the present method is what is most significant. The particular definitions of the time periods associated with different competitive periods may be changed without departing from the intended scope of the invention.

It should be further noted that because there are both time factors and timing variables, the associated SVM algorithm is processing both: (1) the competitive period as a factor; and (2) the effect of the release date year, month, and day. As previously stated above with respect to Steps 203 and 204, the release date data is formatted in independent month, day and year variables such that all three components of the film release date are made independently available for subsequent method step computations.

As stated hereinabove, in accordance with a preferred implementation, the "month" variable is extracted from each set of previously-released film data in the dataset, and subsequently used to define timing factors that correspond to the pre-defined competitive periods. Again, although applicant has defined the particular competitive time periods for the purpose of a preferred implementation, it is contemplated that these pre-defined competitive time periods could be adjusted without departing from the intended scope of the invention. Preferably, the timing factors are employed such that each timing factor corresponds to a single one of the respective predefined competitive periods. That is, the timing factors function as identifying labels distinguishing the pre-defined competitive periods from one another.

For example, continuing with the exemplary implementation, a film released during September, October, November, or December (i.e. the awards season competitive period) may be assigned a timing factor of "2;" a film released during May, June, or July (i.e. the summer competitive period) may be assigned a timing factor of "3;" a film released during March or April (i.e. the aggressive competitive period) may be assigned a timing factor of "4;" and a film released during August, January, or February (i.e. the dump months competitive period) may be assigned a timing factor of "1."

In Step 208, box office performance classifications are defined and added (i.e. related) to the records of the previously-released films (i.e. the films defined below as the "training set"), thereby dividing the movies in the dataset for which box office performance is not being predicted into different groups on the basis of their respective worldwide box office performance. As used herein, any references to worldwide box office at the end of a theatrical run are intended to define the total box office at the end of the theatrical run, regardless of which markets are top-performing for any particular film.

The markets that the present applicant has viewed as the top performing foreign markets at the time of this invention include the following countries: Australia; Brazil; China; France; Germany; Italy; Japan; Mexico; Russia; South Korea; Spain; and the United Kingdom. To wit, the movie Avatar made over $40 million in all of these nations, and over $100 million in most of them. The high-performing markets can change, and using the total box office will always capture those changes, whatever they may be. Furthermore, the present applicant has found that by using the worldwide box office total, the support vector machine (SVM) reflects the box office gross drops and holds of a film. For example, knowledge that the average blockbuster film is in theaters for fourteen (14) weeks, if one presumes an average fifty percent (50%) drop, or decline, in box office gross each weekend, then a total of $600 million versus a total of $1 billion, ceteris paribus (i.e. with other conditions remaining the same), infers steeper drops for the lower grossing film. Accordingly, a prediction that a film will earn less is tantamount to a prediction that fewer people will show up over time to view the film, since the box office grosses reflect the number of tickets purchased, given an average ticket price across the entire set of films in the dataset.

Box office performance classifications are defined in the form of worldwide gross monetary ranges. As will be apparent to those skilled in the art, the particular performance classification ranges used herein are preferred ranges in accordance with the exemplary implementation; however, they are not intended to be limiting. That is, the respective performance classification monetary ranges may be modified without departing from the intended scope of the invention.

Continuing with our exemplary implementation, the method may employ the following four worldwide gross performance classification ranges:

Classification Range 1: (worldwide gross<$531 million)
Classification Range 2: ($531 million≤worldwide gross <$800 million)
Classification Range 3: ($800 million≤worldwide gross ≤$1 billion)
Classification Range 4: (worldwide gross>$1 billion)

In the present case, the classification values assigned to the exemplary Classification Ranges (1, 2, 3, and 4) were (3, 2, 1, and −1), respectively. As those skilled in the art of machine learning code will recognize, the actual classification values (3, 2, 1, −1) assigned to the respective Classification Ranges (1, 2, 3, and 4) were directly dependent on the particular coding software (i.e. R) used. However, different coding software could readily assign a different set of classification values to the same set of Classification Ranges as above, without departing from the intended scope of the invention. What is significant is that each established Classification Range is assigned a unique corresponding classification value distinguishing it from the remaining Classification Ranges, such that individual movies comprising the previously-released movies of the dataset can be easily grouped by Classification Range in accordance with their respective assigned classification codes. Through experimentation, applicant confirmed that the SVM model recognized distinctions between each of the four above-defined Classification Ranges. Predicting each classification could also be refined and fine-tuned. What is most significant is that this is treated as a "classification" problem as opposed to a "regression" problem (e.g. the way that so-called "tracking" type prediction methods do).

Once the classifications have been chosen on the basis of worldwide box office performance, all of the previously-released films with a common box office performance classification have been essentially grouped on the basis of box office performance. The SVM thereby enables determination of, for example, the following: (a) the budget distribution of movies released during a particular year (e.g., $130, $136, $127, $110, $97, $98 million); (b) the ratio of box office performance classifications for films released in a particular year (e.g., 3:10:7:4); (c) the typical box office performance classification for films released during a given month; (d) the typical box office performance classification for films released during a particular competitive period; (e) the typical box office performance classification for films released on a particular day; and (f) other implicit competitive dynamics involving whatever possible combinations of production budget, release date, release day, release month, release year, and competitive period predict whether one film is more similar to a particular classification of box office performance than another film.

Furthermore, as a result of the particular coding (which, again, may or may not be achievable using other comparable coding languages), the SVM can determine, when generating the SVM optimization function, the effect of: (a) the month; (b) the competitive period; (c) the similarity of the year (or portion of a year provided) to other years; (d) the position in the month (since R and other coding languages that have time variables have calendars); (e) the production budget; and (f) the specific date.

This is significant since, for example, although the entire month of August is included as a "dump month," the potential difference between the first week of August and the remainder of August will still be captured by high-performing films in that position (i.e. the first week of August) and on the dates where the user lands at a similar or specific budget (e.g., the movies Guardians of the Galaxy and Suicide Squad). Comparing the effect of the month of August, the specific or similar date within August, the position within August, the competitive period more generally, the year to other years, and the budget, allows for the identification of which classification of films a particular future film that a user is predicting is most like. In other words, it is determining whether this film is most like films with similar budgets released into similar competitive conditions before the film is released—as opposed to making an unverifiable and unfalsifiable claim that a given film would have performed better had it been moved to August, for instance, after it has already flopped, which creates absolutely no informational asymmetry that is of strategic value to a movie studio/distributor.

In Step 210, the dataset collected and organized in Step 202 is divided into separate subsets comprising: (a) a test set comprised of the future film(s) whose performance one wants to predict; and (b) a training set comprised of the previously-released films (e.g. all blockbuster films from 1993 to the present). Furthermore, the model used to later apply the SVM and generate a desired set of predictions is created, and the SVM is imported.

In step 212, the SVM algorithm is optimized. Preferably, a radial kernel or a polynomial kernel is employed to optimize the SVM algorithm on the training set, using a k-fold cross validation method (e.g., preferably a 10-fold cross-validation).

As those having ordinary skill in the art of machine learning coding will readily understand the radial basis function kernel (RBF kernel), alternatively referred to herein as a "radial kernel," is a well-known kernel function in support vector machine (SVM) classification. Likewise, the polynomial kernel function is a well-known kernel function in SVM classification. Furthermore, against the backdrop of applicant's complete disclosure, further details of the step of employing either a radial kernel or polynomial kernel to optimize the SVM algorithm on the training set, using a k-fold cross validation method, would be readily understandable to those skilled in the art. Accordingly, such details are not explicitly described herein.

However, an in-depth discussion of the use of RBF kernels to optimize an SVM algorithm on a training set using k-fold cross-validation can be found, for example, in a textbook authored by Martin D. Buhmann and entitled, Radial Basis Functions: Theory and Implementations (published by Cambridge University Press), the entire contents of which are incorporated-by-reference herein. Moreover, an in-depth disclosure of the general process of classification using SVM with radial basis and polynomial kernel functions can be found in an article entitled, *On Performing Classification using SVM with Radial Basis and Polynomial Kernel Functions*, authored by Gend Lal Prajapati and Arti Patel, and published in the *Third International Conference on Emerging Trends in Engineering and Technology (ICETET* 2010), Goa, India (19-21 Nov. 2010), the entire contents of which are incorporated-by-reference herein.

In a prediction problem such as the present case, a model (e.g. the SVM model) is usually given a dataset of known data on which training data is rin (e.g., the training dataset), and a set of data against which the model is tested (i.e., the testing dataset). The goal of cross validation is to define a dataset to "test" the model in the training phase, in order to limit problems like overfitting and to provide insight on how the model will generalize to an independent dataset. Generally speaking, creating a training dataset and test dataset split of the overall dataset provides a method to efficiently evaluate the performance of the SVM algorithm on a particular problem. The training dataset is used to prepare a model, to train it. Pretending the test dataset is new data where the output values are withheld from the algorithm predictions are gathered from the trained SVM model on the inputs from the test dataset and compared to the withheld output values of the test set. Comparing the predictions and withheld outputs on the test dataset enables computing a performance measure for the model on the test dataset. This is an estimate of the skill of the algorithm trained on the problem when making predictions on unseen data.

One round of cross-validation involves partitioning a sample of data into complementary subsets, performing the analysis on one subset (i.e. the training set), and validating the analysis on the other subset (i.e. the test set). To reduce variability, multiple rounds of cross-validation are performed using different partitions and the validation results are combined (e.g. averaged) over the rounds to estimate a final predictive model. For example, in a preferred implementation of the present method ten rounds (i.e., k=10) of cross-validation are performed.

The goal of cross-validation is to estimate the expected level of fit of a model of a dataset that is independent of the data that were used to train the model. It can be used to estimate any quantitative measure of fit that is appropriate for the data and model. Cross-validation only yields meaningful results if the validation set and the training set are drawn from the same population and only if human biases are controlled, as is the case with the present method.

The use of a radial or polynomial kernel is a critical feature of the present method. It ensures that the dynamics that are modeled are nonlinear, thereby producing an optimal model, on the basis of Cost (C) and Gamma. As is well known to those in the R-coding field, Cost and Gamma are the parameters for nonlinear SVM with a Gaussian radial basis function kernel. A standard SVM seeks to find a margin that separates all positive and negative examples. However, this can lead to poorly fit models if any examples are mislabeled or extremely unusual. To account for this, the idea of a "soft margin" SVM was created that allows some examples to be "ignored" or placed on the wrong side of the margin—leading to a better overall fit. C is the parameter for the soft margin cost function, which controls the influence of each individual support vector; this process involves trading error penalty for stability.

In step 214, the derived optimal SVM model is applied to predict the entries in the test set (i.e. it is applied to the future films to yield a corresponding set of box office performance predictions).

In step 216 a "3-times production budget rule," derived by the present inventor, is applied to the prediction to determine the predicted worldwide box office performance relative to the monetary value derived by multiplying the production budget by three (3). If the monetary value of the predicted worldwide box office performance is less than 3-times the production budget, then the release date, the production budget, or both need to be modified. In other words, according to the present method a movie must gross more than three times (3×) its budget at the box office or else a new release date and/or budget should be chosen. For example, if a film has a production budget of $225 million and is predicted to make less than $531 million then a new release date and/or budget should be chosen, since the predicted return (i.e. <$531 million) is less than $675 million (i.e. 3×$225 million).

In step 218, based upon the result of application of the 3× production budget rule to the prediction, a determination may be made as to whether the predicted box office performance is greater than the 3× budget value. If so, then the selected movie release date and production budget is chosen and the process may end at step 220. Otherwise, an alternative release date, production budget, or both, is/are chosen in step 222, and the process is repeated from step 202.

Applicant is well aware that, as a general rule, where software constitutes part of a preferred mode of carrying out an invention, description of such a preferred implementation is satisfied by disclosure of the functions of the software since, normally, writing code for such software is within the skill of the art, not requiring undue experimentation, once its functions have been disclosed—as is the case with the present invention. Consequently, source code listings are not required for adequately disclosing the functions of software. However, for the purpose of providing even further clarity, the following example is being provided to illustrate a particular hypothetical implementation of the present invention, detailing how one could code (in this example using R Code) the prediction of six (6) blockbuster films against a dataset of blockbuster films using the disclosed inventive box office performance prediction method. Again, the following is a random example included to further elucidate an actual exemplary implementation of the present invention. It is in no way intended to limit the scope of the invention. Thus, the following example may include one or more steps that are not necessary to carry out the invention, steps that could be substituted with alternative steps providing an equivalent function, etc.

Again, what follows is merely an example of some specific portions of coding (again, in this case, using R) illustrating one of myriad ways that some particular steps of the present method could be carried out.

Initially, a text document may be imported including data about all major motion pictures with budgets of at least $96 million, up and until the relevant period of time. For the purpose of the present example, columns containing data may be entitled: Release Date; Production Budget; and Worldwide Grosses, as follows:

```
MovieBoxOfficel←read.delim("C:/Users/User/Desktop/
    Movies/MovieBoxOfficel.txt", header=FALSE, strings
    AsFactors=FALSE)
film←MovieBoxOfficel
names(film)←c("Release Date", "Production Budget",
    "Worldwide Grosses")
```

Subsequently, if necessary, the *Worldwide Grosses and Production Budgets* could be converted from (e.g. text) strings into numbers, so they can be calculated, as follows:

```
film$'Worldwide Grosses'←sapply(strsplit(film$'Worldwide Grosses', split='$',
    fixed=TRUE), function(x) (x[2]))
film$'Worldwide Grosses'←gsub(",","",film$'Worldwide Grosses')
film$'Worldwide Grosses'=as.numeric(film$'Worldwide Grosses')
film$'Worldwide Grosses'
film$'Production Budget'←sapply{strsplit(film$'Production Budget', split='$',
    fixed=TRUE), function(x) (x[2]))
film$'Production Budget'←gsub(",","",film$'Production Budget')
film$'Production Budget'=as.numeric(film$'Production Budget')
film$'Production Budget'
```

Subsequently, the release date(s) may be converted (e.g. based upon our hypothetical case) into an as.date variable, and the data formatted into a Month, Day, and Year; making all three components of the date available for computation, as follows:

```
film$'Release Date'=as.Date{filmfRelease Date', format="% m/% d/% Y")
film$'Release Date'
```

Subsequently, the Month variable may be extracted, and Timing Factors created corresponding to predefined competitive periods, as follows:

```
format(film$'Release Date','%b')
film←mutate(film, Month=format(film$'Release Date', '%b'))
c←filter(film,
    film$Month=='Dec'|film$Month=='Sep'|film$Month=='Nov'|film$Month=='Oct')
c←mutate(c, Timing=2)
d←filter(film,
    film$Month=='May'|film$Month=='Jun'|film$Month=='Jul')
d←mutated(d, Timing=3)
e←filter(film, film$Month=='Mar'|film$Month=='Apr')
e←mutate(e, Timing=4)
f←filter(film,
    film$Month=='Aug'|film$Month=='Jan'|film$Month=='Feb')
f←mutate(f, Timing=1)
b←rbind(c,d,e,f)
film←b
film$Timing←as.factor(film$Timing)
```

Subsequently, box office performance classifications may be created to divide the movies in the dataset of films that are not being predicted into different groups on the basis of their worldwide box office performance, as follows:

```
y←filter(film, film$'Worldwide Grosses'>=1000000000)
y←mutate(y, Billion=-1)
z←filter(film, film$'Worldwide Grosses'>=800000000 &
    film$'Worldwide Grosses'<1000000000)
z←mutate(z, Billion=1)
v←filter(film, film$'Worldwide Grosses'<800000000 &
    film$'Worldwide Grosses'>=531000000)
v←mutate(v, Billion=2)
j←filter(film, film$'Worldwide Grosses'<531000000)
j←mutate(j, Billion=3)
x←rbind(y,z,v,j)
film←x
```

The model used to apply the SVM and generate the desired predictions may be created, as follows:

```
set.seed(O)
x1=film$' Production Budgef x2=film$'Release Date'
x3=film$Timing
y=as.factor(film$Billion)    nonlinear=data.frame(x1, x2,x3, y)
```

The SVM may be imported, and the six films whose worldwide grosses are desired to be predicted may be made into a Test Set, and the remainder of the dataset made into a Training Set, as follows:

library(e1071)
    set.seed(0)
    nonlinear.test=nonlinear[c(37, 159, 55, 82, 122, 149),]
    nonlinear.train=nonlinear[c(1:36,38:54, 56:81, 83:121, 123:148, 150:158, 160:340),]

Subsequently, the Training Set may be optimized by cross-validating the training set with, for example, a radial kernel, as follows:

set.seed(0)
    cv.svm.radial=tune(svm,
      y~ .,
      data=nonlinear.train,
      kernel="radial",
      ranges=list(cost=10^(seq(-1, 1.5, length=20)),
        gamma=10^(seq(-2, 1, length=20))))
    best.nonlinear.model=cv.svm.radial$best.model
    ypred=predict(bestnonlinear.model, nonlinear.test)

This particular hypothetical example produces predictions of the box office classification for the six chosen films. An example of this output for six (6) films might be as follows: -3, -3, -3, 1, 2, -1

Significantly, access to the method of the present invention creates a strategic/competitive advantage to the user (e.g. a film studio or film distributor) due its creation of informational asymmetries between the user and competitors of the user (i.e. a competitive advantage obtained due to an imbalance of knowledge between competing firms). A studio/distributor with better budgeted, and more optimally released, films whose release dates can be firmly established a year or more ahead of time can outperform other (e.g. competing) studios by exploiting their less efficient and sub-optimal decision-making ability. The present method not only predicts outcomes; it creates them by exploiting competitive dynamics to generate a private knowledge advantage for a particular firm having exclusive (or relatively exclusive) use. It would be incredibly useful to a corporate executive at a major distributor to be able to know that the budget and release date combinations for each of the films in their annual slate can be fixed and will not result in a flop, and/or will be profitable ahead of time; especially if their competitors have no similar knowledge about each of their future releases (i.e. because they are limited to tracking, which typically is used 6 weeks prior to a film's release, and other inferior techniques/methods). Furthermore, to the extent that the budget and "release-dating" behavior of a user of the present method is visible to competitors and can be mimicked, that imitative behavior (or competition) will be taken into account in the predictions yielded by the method as new data is added to the dataset.

The accuracy of the method/model of the present invention was further proven based on predictions made by the present inventor/applicant during a pilot test. More than one year prior to its release, Applicant predicted that the film Valerian and the City of Thousand Planets would make less than $531 million. At the time, no box office analyst or data scientist was stating or speculating that it would perform poorly—which it did. Moreover, the production company that financed and produced the film, Europa Corp., was so blindsided by the unexpectedly poor performance of the film that it posted an $83 million loss, considered laying off 28% of its staff, sold off its French TV division, fired its deputy CEO, and entered into talks to sell off the company to Netflix™. Other predictions made in the pilot test have proven to be true, such as, for example, the performance of the films Passengers and Independence Day: Resurgence. All of the predictions were made simultaneously well ahead of time, despite the films being randomly selected and released months apart from one another.

Since many modification, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A method, in a data processing system, for worldwide film box office performance prediction, the method comprising:
    providing a plurality of data records pertaining to a corresponding plurality of previously-released films having respective film release dates falling within a predefined film release date range, film production budgets of at least a predefined film production budget minimum value, and film worldwide box office grosses;
    providing at least one data record pertaining to one or more corresponding films slated for future release, the at least one data record comprising information pertaining to a proposed film release date and a proposed film production budget;
    identifying, via a learning machine functioning as a learning model, relevant patterns based upon objective data associated with said plurality of data records pertaining to said previously-released films for subsequent use predicting the future worldwide box office performance of said one or more films slated for future release;
    creating a learned model, using the plurality of data records pertaining to the corresponding plurality of previously released films, the learned model configured for applying a learning machine algorithm thereto in order to generate a worldwide box office performance prediction, using the at least one data record, for the one or more corresponding films slated for future release;
    optimizing the learning machine algorithm using a cross-validation optimization technique; and
    applying the optimized learning machine algorithm to the at least one data record to predict the worldwide box office performance for the one or more films slated for future release, based upon the corresponding proposed film release date and proposed film production budget.

2. A method as recited in claim 1, wherein the learning machine algorithm further comprises a support vector machine.

* * * * *